(12) United States Patent
Gu et al.

(10) Patent No.: US 8,234,350 B1
(45) Date of Patent: Jul. 31, 2012

(54) SYSTEMS AND METHODS FOR GENERATING TARGETED MANIFEST FILES

(75) Inventors: Lei Gu, Chelmsford, MA (US); Andrew Brian Dicks, Hadleigh (GB)

(73) Assignee: SeaChange International, Inc., Acton, MA (US)

( * ) Notice: Subject to any disclaimer, the term of this patent is extended or adjusted under 35 U.S.C. 154(b) by 0 days.

(21) Appl. No.: 13/330,409

(22) Filed: Dec. 19, 2011

(51) Int. Cl.
*G06F 15/16* (2006.01)

(52) U.S. Cl. ........ 709/217; 709/203; 709/226; 709/231; 709/232; 725/86

(58) Field of Classification Search .................. 709/203, 709/217, 226, 231, 232
See application file for complete search history.

(56) References Cited

U.S. PATENT DOCUMENTS

| | | | | |
|---|---|---|---|---|
| 7,373,406 | B2 * | 5/2008 | Jones et al. | 709/226 |
| 7,584,285 | B2 * | 9/2009 | Hudson et al. | 709/228 |
| 7,634,720 | B2 * | 12/2009 | Haluptzok et al. | 715/234 |
| 8,079,052 | B2 | 12/2011 | Chen et al. | |
| 2003/0023618 | A1 * | 1/2003 | Orbits et al. | 707/203 |
| 2007/0094366 | A1 * | 4/2007 | Ayoub | 709/223 |
| 2008/0172718 | A1 | 7/2008 | Bradley | |
| 2009/0260004 | A1 * | 10/2009 | Datta et al. | 717/175 |
| 2009/0288076 | A1 * | 11/2009 | Johnson et al. | 717/168 |
| 2010/0235472 | A1 | 9/2010 | Sood et al. | |
| 2011/0080940 | A1 | 4/2011 | Bocharov et al. | |
| 2011/0082924 | A1 | 4/2011 | Gopalakrishnan | |
| 2011/0083144 | A1 | 4/2011 | Bocharov et al. | |
| 2011/0314130 | A1 * | 12/2011 | Strasman | 709/219 |
| 2012/0047542 | A1 * | 2/2012 | Lewis et al. | 725/97 |

OTHER PUBLICATIONS

"Flash Media Manifest File Format Specification" Version 1.01, Jun. 28, 2010, pp. 1-5.
"HTTP Live Streaming Overview—Networking & Internet" by Apple Inc., Apr. 1, 2011, pp. 1-38.
"HTTP Live Streaming draft-pantos-http-live-streaming-07" by R. Pantos, Ed., et al., Sep. 30, 2011, pp. 1-33.

* cited by examiner

*Primary Examiner* — Michael Won
(74) *Attorney, Agent, or Firm* — Proskauer Rose LLP

(57) ABSTRACT

A computerized method for dynamically generating a targeted manifest file for use by a playback device to retrieve a video stream including targeted content, includes periodically receiving a manifest file that identifies a sequence of media files, and updating a master manifest file to identify the sequence of media files from each periodically received index file, such that the master manifest file identifies a continuous master sequence of media files that constitute the video stream. The sequence of media files constitutes a portion of a video stream. The method further includes, upon request from a playback device, generating a targeted manifest file from the master sequence of media files. The targeted manifest file identifies a custom sequence of media files that includes targeted content, wherein one or more consecutive media files identified in the master sequence are substituted with a different number of targeted media files in the custom sequence.

21 Claims, 9 Drawing Sheets

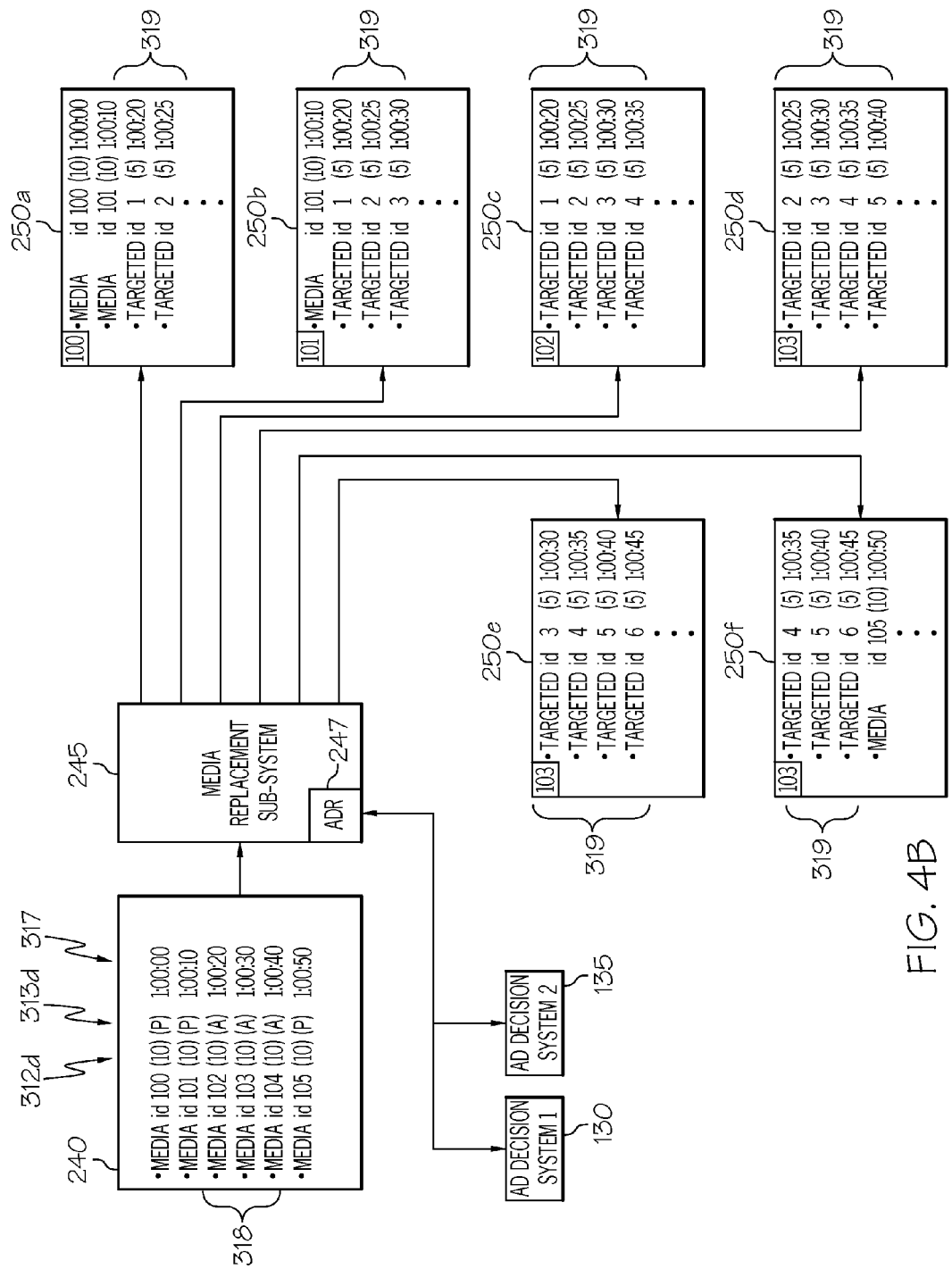

SYSTEMS AND METHODS FOR GENERATING TARGETED MANIFEST FILES

TECHNICAL FIELD

The present inventive concepts generally relate to systems and methods for generating targeted manifest files, and more particularly, to systems, methods and computer readable program products for inserting identifiers of targeted media files within manifest files.

BACKGROUND

HTTP streaming specifications, such as the HTTP Live Streaming specification by Apple Inc. of Cupertino, Calif. and the HTTP Dynamic Streaming specification by Adobe Systems Inc. of San Jose, Calif., describe architectures for providing on-demand and live video streaming to internet-connected devices.

In general, HTTP streaming specifications describe internet-connected devices as receiving audio and video as a sequence of segmented media files. For example, to begin playback of a stream, an internet-connected device fetches a manifest file (e.g., playlist file, index file) from a server system, which can include a base uniform resource locator (URL) or a sequence of uniform resource identifiers (URIs) that identify the locations of consecutive segmented media files of the stream. The client then downloads the segmented media files identified in the manifest file, and begins presenting the stream to a user of the internet-connected device. To accommodate live broadcasts, the internet-connected device can periodically fetch and load new versions of the manifest file, which include URIs that identify the locations of new segmented media files of the live stream. In this manner, a sequence of manifest files can be created to accommodate live broadcasts, where media segment files are continually being produced.

Conventional streaming systems that implement the above HTTP streaming specifications typically include a media encoder and stream segmenter. The media encoder encodes the prerecorded content or live broadcasts into a video transport stream, which is then broken into segmented media files by the stream segmenter. The stream segmenter also creates the manifest files, which include a sequence of URIs that identify consecutive segmented media files of the stream. However, at this time there is no mechanism for inserting URIs or replacing URIs in the manifest files created by the stream segmenter with URIs that identify targeted media files, such as, advertisement media files, news or weather alert media files or other user-targeted types of media files.

SUMMARY

Embodiments of the present inventive concepts are directed in part to systems, methods computer readable program products for inserting and/or substituting media locators, such as URIs, of targeted media files within manifest files. The targeted media files can include advertisement media files, news or weather alert media files or other user-targeted types of media files.

In one aspect, a computerized method for dynamically generating a targeted manifest file for use by a playback device to retrieve a video stream including targeted content, comprises periodically receiving a manifest file that identifies a sequence of media files, the sequence of media files constituting a portion of a video stream, updating a master manifest file to identify the sequence of media files from each periodically received index file, such that the master manifest file identifies a continuous master sequence of media files that constitute the video stream, and upon request from a playback device, generating a targeted manifest file from the master sequence of media files, the targeted manifest file identifying a custom sequence of media files that includes targeted content, wherein one or more consecutive media files identified in the master sequence are substituted with a different number of targeted media files in the custom sequence.

In some embodiments, each periodically received manifest file includes a media sequence number that represents a first media file identified in the sequence of media files, the method further comprises determining a unique sequence number of each of the media files identified in the periodically received index file based on the media sequence number, and updating the master manifest file to identify the media files identified in the periodically received index file that are missing from the master sequence of media files.

In some embodiments, updating the master manifest file includes comparing the unique sequence number of each of the media files identified in the periodically received index file with the unique sequence number of each media files of the continuous master sequence of media files to identify the media files identified in the periodically received index file that are missing from the master sequence of media files.

In some embodiments, updating the master manifest file includes comparing the unique sequence number of each of the media files identified in the periodically received index file with the unique sequence number of the last media file identified in the continuous master sequence of media files to identify the media files identified in the periodically received index file that are missing from the master sequence of media files.

In some embodiments, wherein generating the targeted manifest file from the master sequence of media files further comprises substituting at least two consecutive media files identified in the master sequence associated with a combined presentation period with a different number of targeted media files in the custom sequence having the same combined presentation period.

In some embodiments, substituting the at least two consecutive media files includes substituting the at least two consecutive media files identified in the master sequence associated with the combined presentation period with a greater number of targeted media files in the custom sequence having the same combined presentation period.

In some embodiments, substituting the at least two consecutive media files includes substituting the at least two consecutive media files identified in the master sequence associated with the combined presentation period with a fewer number of targeted media files in the custom sequence having the same combined presentation period.

In some embodiments, generating the targeted manifest file from the master sequence of media files further comprises requesting a user profile associated with a user of the playback device, and identifying the targeted media files for substitution based on at least one characteristic of the user profile.

In some embodiments, the one or more consecutive media files are identified for substitution based on an informational tag associated with each of the one or more consecutive media files, wherein the informational tag identifies the associated media file as an advertisement.

In another aspect, a computerized system for dynamically generating a targeted manifest file for use by a playback device to retrieve a video stream including targeted content, comprises a content publishing system configured to periodically receive a manifest file from a transcoding system, the manifest file identifying a sequence of media files that constitute a portion of a video stream, wherein the content publishing system is configured to update a master manifest file to identify the sequence of media files from each periodically received index file, such that the master manifest file identifies a continuous master sequence of media files that constitute the video stream, and upon request from a playback device, generate a targeted manifest file from the master sequence of media files, the targeted manifest file identifying a custom sequence of media files that includes targeted content, wherein one or more consecutive media files identified in the master sequence are substituted with a different number of targeted media files in the custom sequence.

In another aspect, a computer program product, tangibly embodied in a computer readable storage device, for dynamically generating a targeted manifest file for use by a playback device to retrieve a video stream including targeted content, comprises instructions being executable to cause a computer to periodically receive a manifest file that identifies a sequence of media files, the sequence of media files constituting a portion of a video stream, update a master manifest file to identify the sequence of media files from each periodically received index file, such that the master manifest file identifies a continuous master sequence of media files that constitute the video stream, and upon request from a playback device, generate a targeted manifest file from the master sequence of media files, the targeted manifest file identifying a custom sequence of media files that includes targeted content, wherein one or more consecutive media files identified in the master sequence are substituted with a different number of targeted media files in the custom sequence In another aspect, a computerized method for dynamically generating targeted manifest files for use by playback devices in retrieving video streams that include targeted content, comprises periodically receiving a manifest file that includes a first sequence of media file locators, the media file locators identifying media files constituting at least a portion of a video stream, updating a master manifest file to include the first sequence of media file locators from each periodically received manifest file, such that the master manifest file includes a master sequence of the media file locators that constitute the video stream, upon request from a playback device, generating a targeted manifest file from the master sequence of media file locators that includes a second sequence of media file locators, wherein one or more media file locators of the master sequence are substituted with a different number of targeted media file locators to generate the second sequence of the targeted manifest file.

In some embodiments, each periodically received manifest file includes a media sequence number that indicates a unique sequence number of a first media file locator in the first sequence, the method further comprises determining a unique sequence number of each media file locator in the first sequence based on the media sequence number of the received manifest file, and updating the master manifest file to include the media file locators of the first sequence that are missing from the master sequence.

In some embodiments, the received manifest file includes at least one informational tag that specifies a time duration of the media files identified by the media file locators of the first sequence.

In some embodiments, generating the master manifest file further includes assigning relative timestamps to each of the media file locators of the master sequence based on the at least one informational tag.

In some embodiments, the computerized method further comprises requesting a user profile associated with a user of a playback device, and identifying the targeted media file locators for substitution based on at least one user characteristic of the user profile.

In some embodiments, generating the targeted manifest file from the master sequence of media file locators further comprises substituting at least two media file locators of the master sequence with a different number of targeted media file locators, wherein a combined time duration of the media files identified by the at least two media file locators of the master sequence is substantially similar to a combined time duration of the media files identified by the different number of targeted media file locators.

In some embodiments, generating the targeted manifest file from the master sequence of media file locators further comprises selecting the one or more media file locators of the master sequence for substitution based on the content type of the media files identified by the one or more media file locators.

In some embodiments, generating the targeted manifest file from the master sequence of media file locators further comprises requesting the targeted media file locators from one or more ad decision systems based on a combined time duration of the one or more media file locators that are selected for substitution.

In some embodiments, generating the targeted manifest file from the master sequence of media file locators further comprises requesting the targeted media file locators from the one or more ad decision systems based on at least one user characteristic, group characteristic, content type or request time of day.

In some embodiments, requesting the targeted media file locators further comprises receiving a target identifier that identifies a location of a target manifest file, wherein the target manifest file includes the targeted media file locators.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIGS. 4A-4C illustrate substitution of media file locators within manifest files, according to embodiments of the present invention.

DETAILED DESCRIPTION

Figure 1:
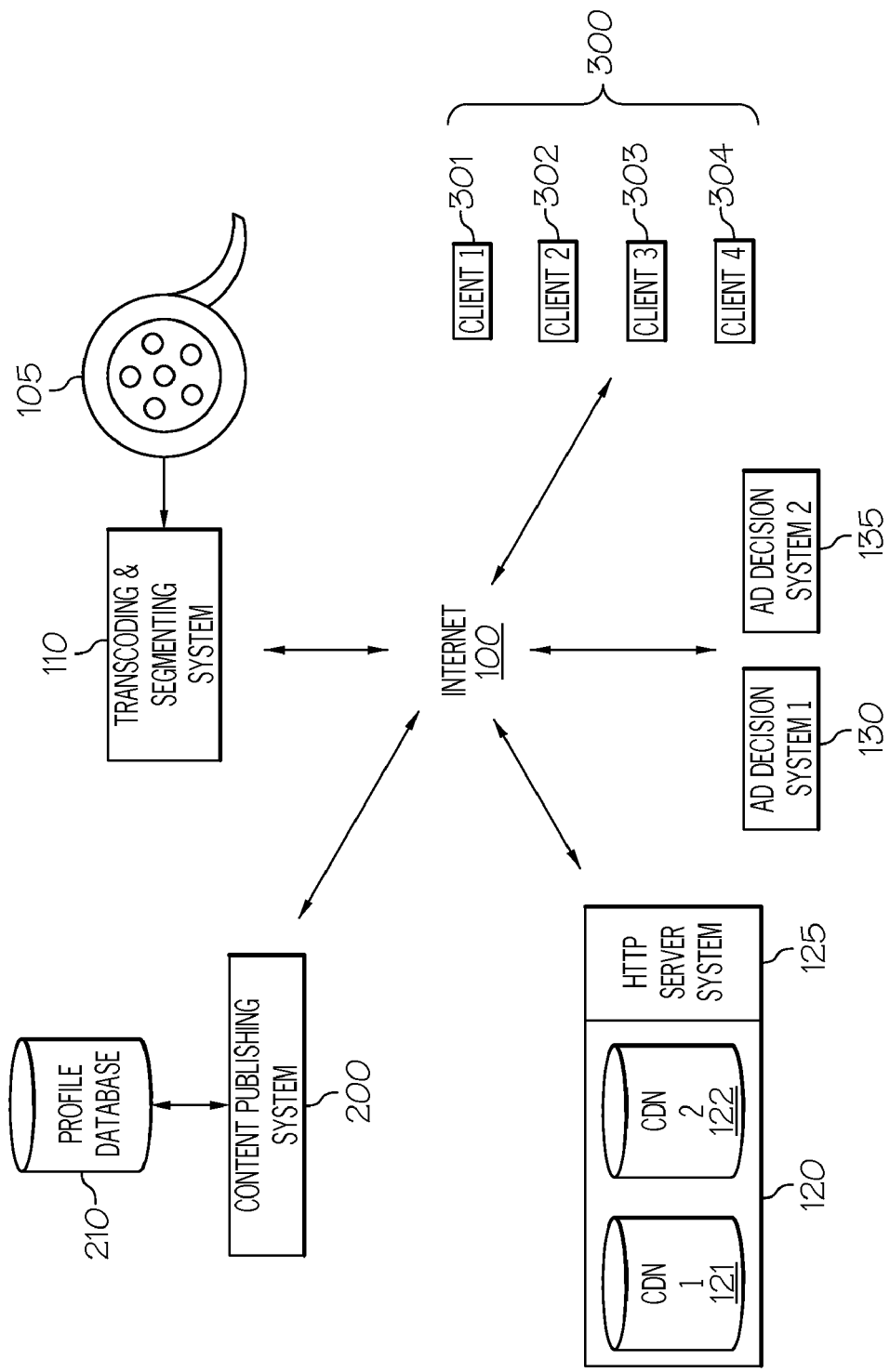
FIG. 1 is a diagram that illustrates a HTTP streaming architecture, according to one embodiment of the present invention.
Figure 2:
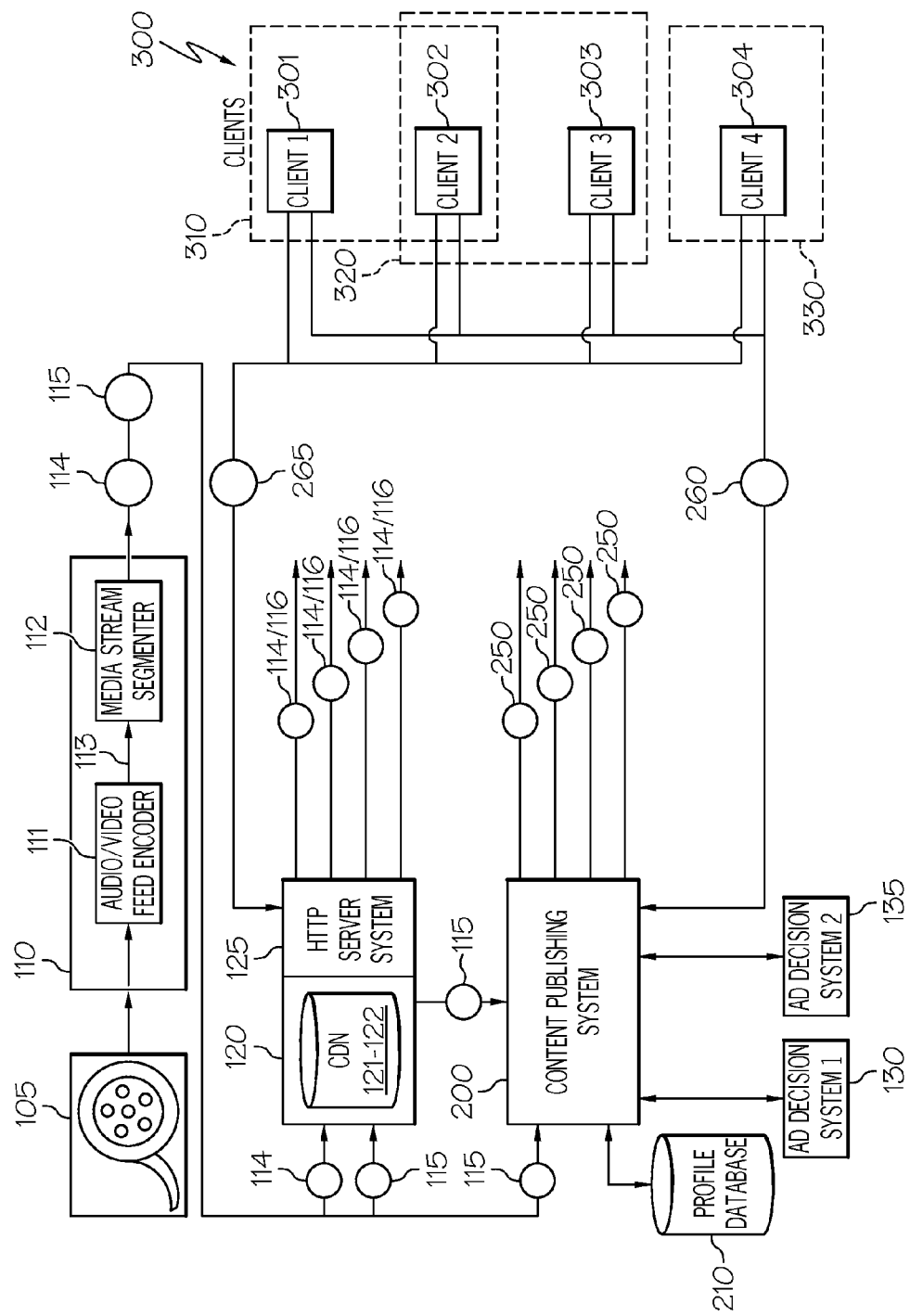
FIG. 2 is a work flow diagram that illustrates processes associated with the systems and devices shown in FIG. 1, according to one embodiment of the present invention.

FIG. 1 is a diagram that illustrates a HTTP streaming architecture, according to one embodiment of the present invention, and FIG. 2 is a work flow diagram that illustrates processes associated with the systems and devices shown in FIG. 1, according to one embodiment of the present invention. The Internet 100 is a global hardware and software communications network that comprises private and public computer systems and networks. The Internet 100 is designed to transfer electronic information between computer systems, devices and networks located around the world.

As shown in FIG. 1, a transcoder system 110, a content delivery network 120, a HTTP server system 125, a first ad decision system 130, a second ad decision system 135, a content publishing system 200 and one or more client device 300 are connected to the Internet 100. While each of the systems and devices are shown connected to the Internet 100, a subset of the systems and devices can be connected within private networks having access to the Internet 100.

The transcoding and segmenting system 110 can comprise one or more computer systems that are configured to receive at least one audio/video feed 105. The audio/video feed 105 may include live broadcasts or prerecorded content. The transcoding and segmenting system 110 is further configured to digitally encode the audio/video feed 105, and encapsulate the digitally encoded audio/video feed into a series of segmented media files 114 for distribution.

For example, the exemplary transcoding and segmenting system 110 shown in FIG. 2 includes an audio/video feed encoder 111 and a media stream segmenter 112. The audio/video feed encoder 111 digitally encodes the audio/video feed 105, and packages the encoded audio/video feed into a media stream 113. The audio/video feed encoder 111 can encode the audio/video feed 105 in MPEG format, such as the MPEG-4 format, and can package the encoded audio/video feed into an MPEG transport stream format, such as the MPEG-2 transport stream format.

The media stream segmenter 112 receives the media stream 113 from the audio/video feed encoder 111, and segments the media stream 113 into a series of consecutive media files 114 (e.g., .ts files, .f4f files) that each constitutes a portion of the media stream 113. The media stream segmenter 112 transmits the media files 114 to a content distribution system, such as the content delivery network 120 shown in FIGS. 1 and 2. The media stream segmenter 112 also generates manifest files 115 that include a sequence of media file locators, such as URIs, that identify the locations of the segmented media files 114 of the media stream 113, and transmits the manifest files 115 to the content publishing system 200 or the content delivery network 120. In this manner, the manifest files 115 can be used by the content publishing system 200 to track the availability and location of segmented media files 114 generated by the transcoding and segmenting system 110.

The transcoding and segmenting system 110 can also be configured to generate one or more informational tags (see for example, the informational tags 311 of FIG. 3) for inclusion in the manifest files 115. The informational tags can identify a content type (e.g., programming, advertisement, news) of one or more media files 114 identified by the media file locators. For example, the audio/video feed 105 can include cue tones, such as SCTE-35 cue tones, for signaling local interstitial availabilities. Upon detecting a cue tone, the transcoding and segmenting system 110 can request durational information associated with the interstitial availabilities from, for example, a placement opportunity information system. The durational information can be used to properly package the audio/video feed 105 so that the content publishing system 200 can replace, for example, general advertising media files or ad breaks, with media file locators identifying targeted media files 116.

The media stream segmenter 112 can generate the manifest files 115 in an M3U format, such as the M3U8 format, a Flash media format, such as the Flash media manifest F4M format, or another manifest file format. The HTTP Live Streaming M3U format specification published by Apple, Inc. of Cupertino, Calif. on Sep. 30, 2011 (version 7) is incorporated herein by reference in its entirety. While the exemplary embodiments shown and described herein illustrate systems and methods for inserting and/or substituting media locators, such as URIs, of targeted media files within manifest files conforming to the HTTP Live Streaming M3U format, it will be understood by those of ordinary skill in the art, that the present inventive concepts can be readily adapted and applied to other streaming architectures and other manifest file formats, such as, for example, the Flash media manifest file format specification published by Adobe Systems Inc. of San Jose, Calif. on Jun. 28, 2010 (version 1.01), which is incorporated herein by reference in its entirety.

In the exemplary HTTP streaming architecture shown in FIG. 1, the content distribution system 120 includes a content delivery network 121, 122, which can include a plurality of content delivery nodes. The content distribution system 120 also includes a HTTP server system 125 that is configured to transmit and receive segmented media files 114 and/or manifest files 115. The content distribution system 120 receives the media files 114 transmitted from the transcoding and segmenting system 110, and caches the media files 114 for delivery to the one or more client devices 300. The content distribution system 120 can also receive the manifest files 115 transmitted from the transcoding and segmenting system 110. The content distribution system 120 can be provided in addition to or in substitution of a standalone HTTP file server to improve access bandwidth and redundancy of the stored media files 114.

The content publishing system 200 can comprise one or more computer systems that are configured to periodically fetch and receive the manifest files 115 generated by the transcoder system 110, and generate and/or update a master manifest file (see for example, the master manifest file 240 of FIG. 3) that includes the media file locators listed in the received manifest files 115. The content publishing system 200 can fetch the manifest files 115 from the transcoding and segmenting system 110 or the content distribution system 120. While the master manifest file can correspond to a manifest file format, such as the M3U or the F4M format, the master manifest file can also correspond to other types of manifest file formats.

In response to a request 260 from a client device 300, the content publishing system 200 generates one or more targeted manifest files 250 that identify a custom sequence of media files including targeted content. For example, the custom sequence of media files can identify one or more media files 114 associated with a specific audio/video feed 105 and one or more targeted media files 116 associated with an advertisement, news alert or other type of user-targeted content. The content publishing system 200 transmits the targeted manifest files 250 to the client device 300, which sends a request 265 for the media files 114, 116 listed in the targeted manifest files 250 to the content delivery network 120. The client device 300 begins presenting a modified audio/video stream to a user after receiving one or more of the requested media files 114, 116. The targeted manifest files 250 may be generated in the M3U format, such as the M3U8 format, the Flash media format, such as the F4M format or another manifest file format.

Further, the content publishing system 200 can request a user profile associated with a user of a client device 300 or a group profile associated with a group of users 310, 320, 330 from a profile database 210, and identify targeted media files 116 for inclusion in the targeted manifest files 250 based on at least one characteristic of the user profile or group profile. The profile database 210 includes a plurality user or group profiles that each includes one or more user or group characteristics. The user or group characteristics can be is selected from the group consisting of: user's age, user's geographic location, user's gender, user's race, user's home ownership, user's employment status, user's household income, user's martial status, prior user stream requests and monitored user interests. The content publishing system 200 can also identify targeted media files 116 for inclusion in the targeted manifest files 250 based on characteristics of client devices, content of requested audio/video feeds, and time/date of the requested audio/video feed.

For example, a first group 310 of clients 301, 302 associated with a specific group characteristic, such as a geographic location, may be provided targeted content such as local advertising content or local news content. A second group 320 of clients 302, 303 associated with a specific group characteristic, such as household income, may be provided targeted content such as advertising content tailored to a demographic having a particular range of household income. A third group 330 or individual client 304 may be provided targeted content such as advertising content, news content or other content that is tailored to one or more characteristics of the user's profile.

The content publishing system 200 can also request media file locators associated with targeted media files 116 from one or more ad decision systems 130, 135 to generate the one or more targeted manifest files 250. The requests can be based on a combined time duration of one or more media file locators of the master manifest file that are selected for substitution and/or one or more user or group characteristics associated with the requesting client device 300 or other characteristic. The one or more media file locators of the master manifest file that are selected for substitution can be substituted with one or media file locators that identify targeted media files 114 having a combined time duration that is less than, equal to, or greater than the combined time during of the one or more substituted media files. For example, one or more consecutive media files 114 of a stream having a combined time duration of 30 seconds can be substituted with targeted media files 116 having a combined time duration of 20 seconds, 30 seconds or 40 seconds.

The content publishing system 200 can select one or more media file locators of the master manifest file for substitution based on the content type of the media files 114 identified by the one or more media file locators. For example, media file locators of the master manifest file can be tagged as being associated with a media file 114 that includes general advertising content or general news content. The content publishing system 200 can substitute the media file locators associated with media files 114 that include general advertising content or general news content with one or more media file locators that are associated with targeted media files 116 that include targeted content, such as local advertising content or local news content.

The client devices 300 can comprise various types of computer systems, communication devices, and other types of internet connected devices. For example, the client devices 300 can include, for example, personal computers (PCs), laptop computers, netbook computers, mobile devices, cell phones or smart phones, television set top boxes, display panels, tablets, internet-connected television sets and game consoles.

Figure 3:
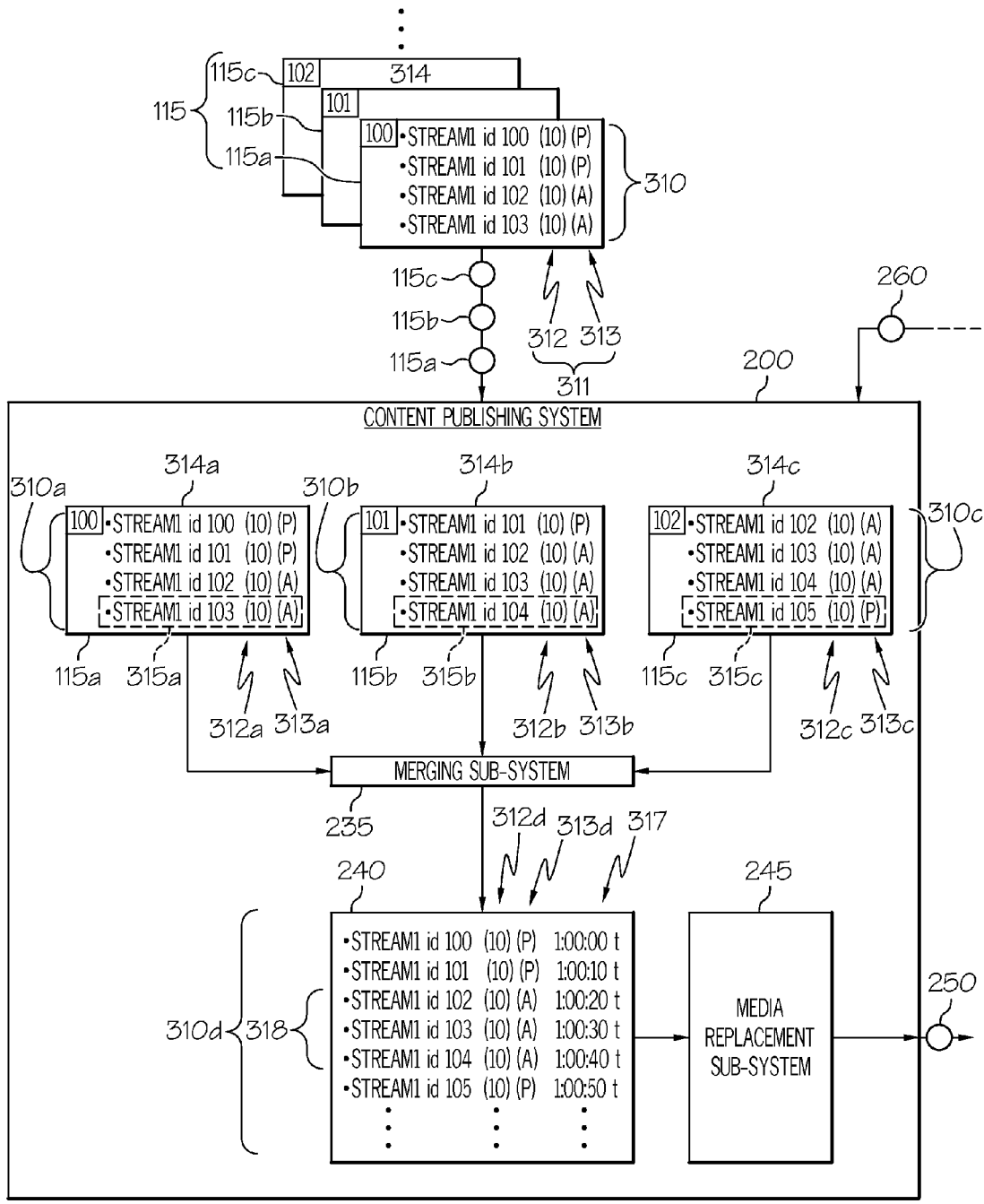
FIG. 3 is a work flow diagram that illustrates processes associated with the content publishing system shown in FIGS. 1 and 2, according to one embodiment of the present invention.

FIG. 3 is a work flow diagram that illustrates processes associated with the content publishing system shown in FIGS. 1 and 2, according to one embodiment of the present invention. As described above, the content publishing system 200 is configured to periodically fetch manifest files generated by the transcoding and segmenting system 110. In one embodiment, the content publishing system 200 periodically fetches manifest files 115 from the transcoding and segmenting system 110. In other embodiments, the content publishing system 200 periodically fetches manifest files 115 from the content distribution system 120. The content publishing system 200 can fetch the manifest files 115 at a fixed time interval or at an irregular time interval. For example, the exemplary content publishing system 200 of FIG. 3 is shown receiving first through third manifest files 115*a-c* one after the other, which include URIs of additional segmented media files 115. As described above, to accommodate live broadcasts, the content publishing system 200 can fetch new versions of the manifest file 115 that include URIs of newly encoded media files 115.

Each manifest file 115 received by the content publishing system 200 includes a sequence of media file locators 310 that identify the locations of consecutive segmented media files of a stream and one or more informational tags 311 that can be associated with each media file locator. The informational tags 311 can include a time duration tag 312 that identifies a time duration of the media file identified by the associated media file locator 310 and/or a content tag 313 that identifies a content type (e.g., programming, advertisement, news) of the media file identified by the associated media file locator 310.

Each manifest file 115 can also include a unique media sequence number 314 that represents the sequence number of the media file 114 identified by the first media file locator 310 in the manifest file 115. In this manner, the sequence number of each media file locator 310 in the manifest file 115 can be determined.

For example, the media sequence number 314*a* of the manifest file 115*a* is "100", which indicates that the first media file locator 310*a* of the manifest file 115*a* identifies the $100^{th}$ media file segment 114 of a stream. Based on the media sequence number 314*a*, the sequence number of each subsequent media file locator 310*a* of the manifest file 115*a* can be determined by incrementing the media sequence number 314 for each subsequent media file locator 310*a* listed in the manifest file 115*a*.

The content publishing system 200 generates and/or updates a master manifest file 240 of media file locators 310*d* with the media file locators 310*a-c* included in each of the received manifest files 115*a-c*. In this manner, the master manifest file 240 can identify a continuous master sequence of media file locators 310*d* that are associated with media files 114 of a specific stream. For example, a merging sub-system 235 of the content publishing system 200 receives and processes the manifest files 115, and adds media file locators 310 of the received manifest files 115 that are missing from the master sequence of media file locators 310*d* to the master manifest file 240.

For example, upon receiving the manifest file 115a, the merging sub-system 235 determines the sequence number of each media file locator 310a based on the media sequence number 314a, and updates the master manifest file 240 of media file locators 310d with newly recognized media file locators 310a of the manifest file 115a. In this example, the manifest file 115a includes a new media file locator 315a, which is added to the master manifest file 240 of media file locators 310d by the merging sub-system 235. Upon receiving the next manifest file 115b, the merging sub-system 235 determines the sequence number of each media file locator 310b based on the media sequence number 314b, and updates the master manifest file 240 of media file locators 310d with newly recognized media file locators 310b of the second manifest file 115b. In this example, the manifest file 115b includes a new media file locator 315b, which is added to the master manifest file 240 of media file locators 310d by the merging sub-system 235. Upon receiving the next manifest file 115c, the merging sub-system 235 determines the sequence number of each media file locator 310c based on the media sequence number 314c, and updates the master manifest file 240 of media file locators 310d with newly recognized media file locators 310c of the manifest file 115c. In this example, the manifest file 115c includes a new media file locator 315c, which is added to the master manifest file 240 of media file locators 310d by the merging sub-system 235. In this manner, the master manifest file 240 of media file locators 310d can be created and/or updated to accommodate live broadcasts, where segmented media files 114 of a live broadcast are continually being produced.

In addition to adding newly recognized media file locators 310 to the master manifest file 240, the merging sub-system 235 can also add one or more informational tags 311 associated with each media file locator 310 of the received manifest files 115 to the maser manifest file 240. In this example, the master manifest file 240 of media file locators 310d includes time duration tags 312d that identify a time duration of a media file 114 identified by an associated media file locator 310d and content tags 313d that identify a content type of the media file 114 identified by the associated media file locator 310d. The master manifest file 240 can include one or more of the above informational tags 311 or other information tags described in the HTTP Live Streaming M3U format specification. The informational tags 311 can be extracted from the manifest files 115a-c received at the content publishing system 200, or can be received from the transcoding and segmenting system 110.

The merging sub-system 235 can also assign relative timestamps 317 to each of the media file locators 310d of the master manifest file 240 based on the running time of the stream associated with the media file locators 310d. The running time can be determined based on the sequence number and time duration tag 312d associated with each media file locator 310d of the master manifest file 240.

Upon receiving a request 260 from a client device 300, a media replacement sub-system 245 of the content publishing system 200 generates a sequence of targeted manifest files 250 that include a custom sequence of media file locators that identify media files 114 of a specific stream or asset and targeted media files 116 including targeted content. For example, one or more media file locators 318 of the master manifest file 240 can be substituted with a different number of media file locators identifying targeted media files 116. The one or more media file locators 318 can be selected for substitution based on a grouping of media file locators that are marked as identifying advertising content. The media replacement sub-system 245 can also request targeted media file locators from one or more ad decision systems 130, 135 to generate the targeted manifest files 250. In one embodiment, one of the ad decision systems 130, 135 provides a target identifier to the media replacement sub-system 245 that identifies a location of a target manifest file including the targeted media file locators. In other embodiments, one of the ad decision systems 130, 135 provides the targeted media file locators to the media replacement sub-system 245.

In the exemplary examples shown and described below, three media file locators 318 having a combined time duration of thirty seconds are substituted with a different number of targeted media file locators having the same combined time duration of thirty seconds. The substituted media file locators 318 can be associated with advertising content, which can be identified by an advertising content tag 313. These examples, however, are not limiting and the inventive concepts described herein lend themselves to any number of media file locators, combined time durations, and/or content tag types.

Figure 4A:
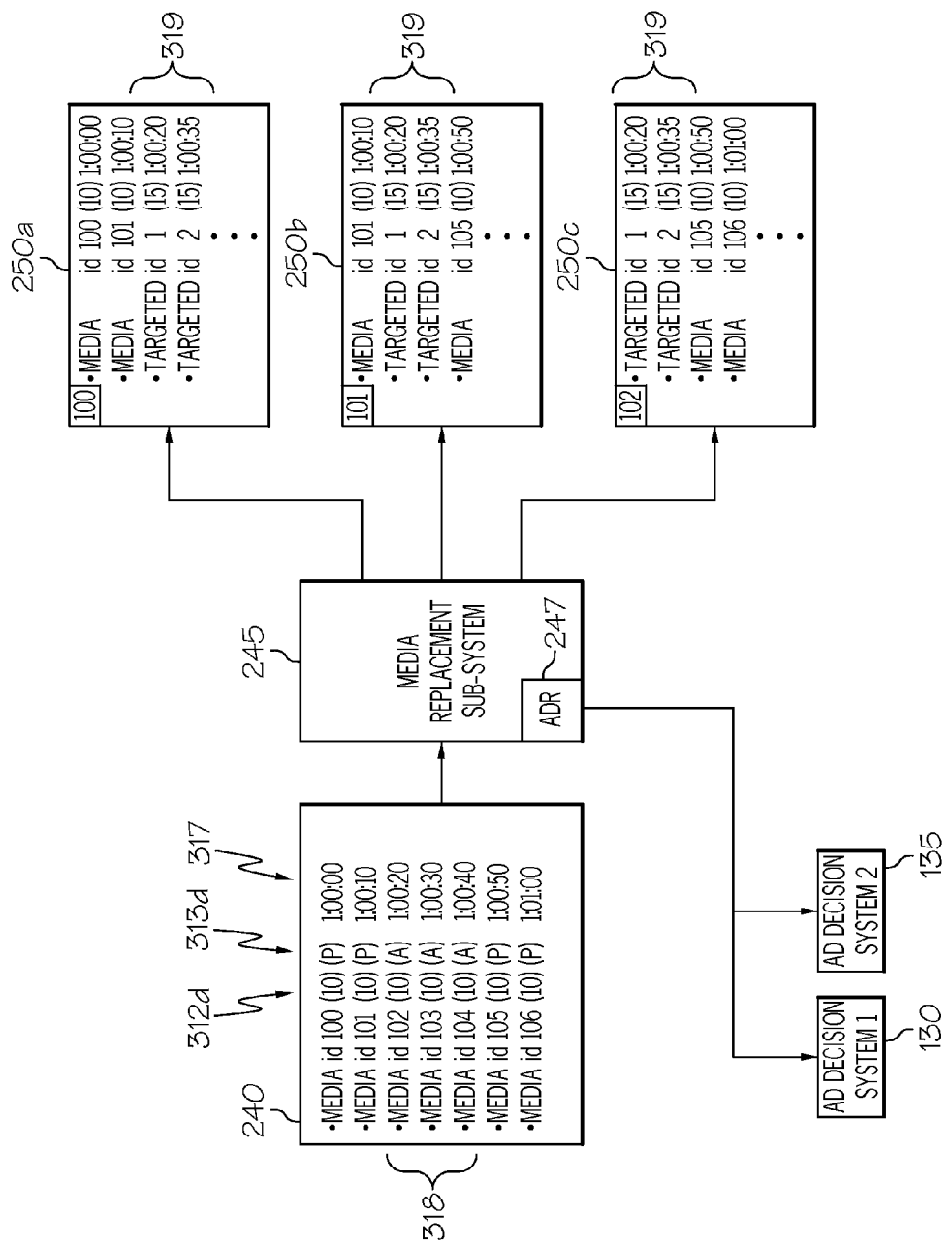
Figure 4C:
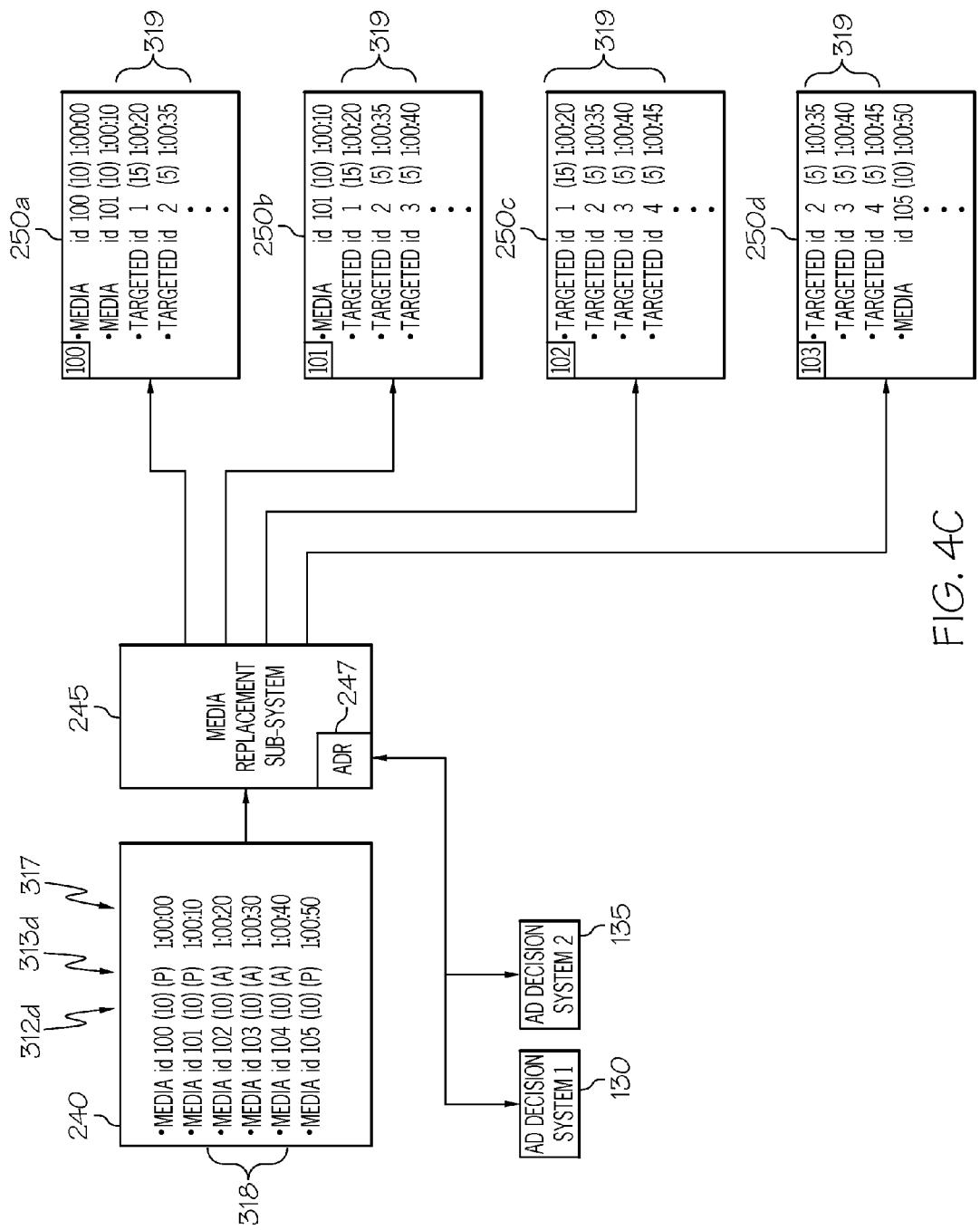

FIGS. 4A-4C illustrate substitution of media file locators within manifest files, according to embodiments of the present invention. The media replacement sub-system 245 can generate a single targeted manifest file 250 or a sequence of targeted manifest files 250a-c, 250a-f, 250a-d in response to a client device request for a broadcast stream or a video-on-demand asset. In the case of a live broadcast, the media replacement sub-system 245 generates targeted manifest files 250 as newly received manifest files 115 are processed by the merging sub-system 235. In this manner, the content publishing system 200 can generate the sequence of targeted manifest files 250a-c, 250a-f, 250a-d to accommodate live broadcasts, where segmented media files 114 are continually being produced. While the examples shown in FIGS. 4A-4C are based on a live broadcast, where the master manifest file 240 is continually updated with newly recognized media file locators of the received manifest files 115, the media replacement sub-system 245 can also generate a single targeted manifest file 250 for video-on-demand assets.

In the below examples, the targeted manifest files 250 are shown including four (4) media file locators for the purpose simplifying the present inventive concepts. However, the manifest files generated by the transcoding and segmenting system 110 and/or the targeted manifest files 250 generated by the media replacement sub-system 245 can include any number of media file locators, and, in some embodiments, can include a different number of media file locators. In each of the examples shown in FIGS. 4A-4C a different number of targeted media file locators 319 are substituted for the same number of media file locators 318, which, in the below examples is three.

Referring to FIGS. 3 and 4A, the media replacement sub-system 245 generates a sequence of targeted manifest files 250a-c in response to a client device request 260. The targeted manifest files 250a-c are generated as newly recognized media file locators 315a-c are added to the master manifest file 240. In this example, three media file locators 318 having a combined time duration of 30 seconds are selected for substitution with a fewer number of targeted media file locators 319, which in this example includes two targeted media file locators each having a time duration of fifteen seconds. The three media file locators 318 selected for substitution can be identified as being associated with advertising content of a specific stream by the content tags 313d.

Referring to FIGS. 3 and 4B, the media replacement sub-system 245 generates a sequence of targeted manifest files 250a-f in response to a client device request 260. The targeted manifest files 250a-f are generated as newly recognized media file locators 315a-c are added to the master manifest file 240. In this example, three media file locators 318 having a combined time duration of 30 seconds are selected for substitution with a greater number of targeted media file locators 319, which in this example includes six targeted media file locators each having a time duration of five seconds. The three media file locators 318 selected for substitution can be identified as being associated with advertising content of a specific stream by the content tags 313d.

Referring to FIGS. 3 and 4C, the media replacement sub-system 245 generates a sequence of targeted manifest files 250a-d in response to a client device request 260. The targeted manifest files 250a-d are generated as newly recognized media file locators 315a-c are added to the master manifest file 240. In this example, three media file locators 318 having a combined time duration of 30 seconds are selected for substitution with a greater number of targeted media file locators 319, which in this example includes one targeted media file locator having a time duration of fifteen seconds and three targeted media file locators having a time duration of five seconds. The three media file locators 318 selected for substitution can be identified as being associated with advertising content of a specific stream by the content tags 313d.

Referring back to FIG. 3, upon receiving a client device request 260 for a broadcast stream or video-on-demand asset, the media replacement sub-system 245 generates one or more targeted manifest files 250. During the process of generating the one or more targeted manifest files 250, the content publishing system 200 can select media file locators 318 of the master manifest file 240 for substitution with targeted media file locators. In the examples described in connection with FIGS. 4A-4C, a different number of targeted media file locators 319 are substituted for the same number of media file locators 318. This substitution can introduce sequencing errors. For example, in FIG. 4A three (3) media file locators 318 of the master manifest file 240 are substituted with two (2) targeted media file locators 319. In this case, if the targeted manifest files 250a-c were generated based on the media sequence number associated with each of the media file locators 310d of the master manifest file 240, the media file locator identifying the 104$^{th}$ segmented media file would follow the second targeted media file locator 319 leading to a sequencing error. That is, the media file locator identifying the 104$^{th}$ segmented media file 114 would be included in the targeted manifest files 250 instead of being substituted for the targeted media file locators 319.

To eliminate the above sequencing error, the media replacement sub-system 245 generates targeted manifest filed 250 based on the relative timestamps assigned to the media file locators 310d of the master manifest file 240. For example, during the process of generating the one or more targeted manifest files 250, the media replacement sub-system 245 includes media file locators 310d of the master manifest file 240 in the targeted manifest files 250 based on the relative timestamps 317 assigned to the substituted media file locators 318. As a result of the timestamp based substitution, the two (2) targeted media file locators 319 of FIG. 4A that replace the three (3) media file locators 318 having relative timestamps ranging between 1:00:20 and 1:00:50 are followed by the media file locator identifying the 105$^{th}$ segmented media file having a relative timestamp of 1:00:50. In one embodiment, the media replacement sub-system 245 can include a newly recognized media file locator 315a-c in a targeted manifest file 250 if the newly recognized media file locator 315a-c has a relative timestamp 317 greater than or equal to the relative timestamp 317 of the last media file locator of the targeted manifest file 240 plus the duration of the media file identified by the last media file locator.

The media replacement sub-system 245 includes an optional ad decision router 247 that is configured to select an ad decision system 130, 135 based on, for example, a configurable rule set. The configurable rule set can include rules for selecting an ad decision system based on user or group characteristics, content characteristics, and/or pricing schedules of the ad decision systems 130, 135. After receiving the targeted media file locators 319, the media replacement sub-system 245 generates a sequence of targeted manifest files 250 for transmission to the requesting client device. In one embodiment, the content publishing system 200 can request targeted manifest files 250 each time a targeted manifest file 250 is generated. Alternatively, the content publishing system 200 can request targeted manifest files 250 after identifying and selecting a group of media file locators 318 for replacement.

The methods and processes disclosed herein can be implemented by the above systems and devices, or equivalent systems and devices, executing a unique set of instructions stored or embodied in computer accessible media. As will be appreciated by those skilled in the art, a unique set of instructions can be implemented or embodied as executable code, such as, software, firmware, machine code or a combination thereof. As such, the unique set of instructions stored or embodied in computer accessible media transforms the above systems and devices into particular, special purpose systems and devices that can operate, for example, according to the following exemplary flow diagrams. In some embodiments, unique sets of instructions correspond to the methods and processes disclosed in FIGS. 5-7 and described below in further detail.

Figure 5:
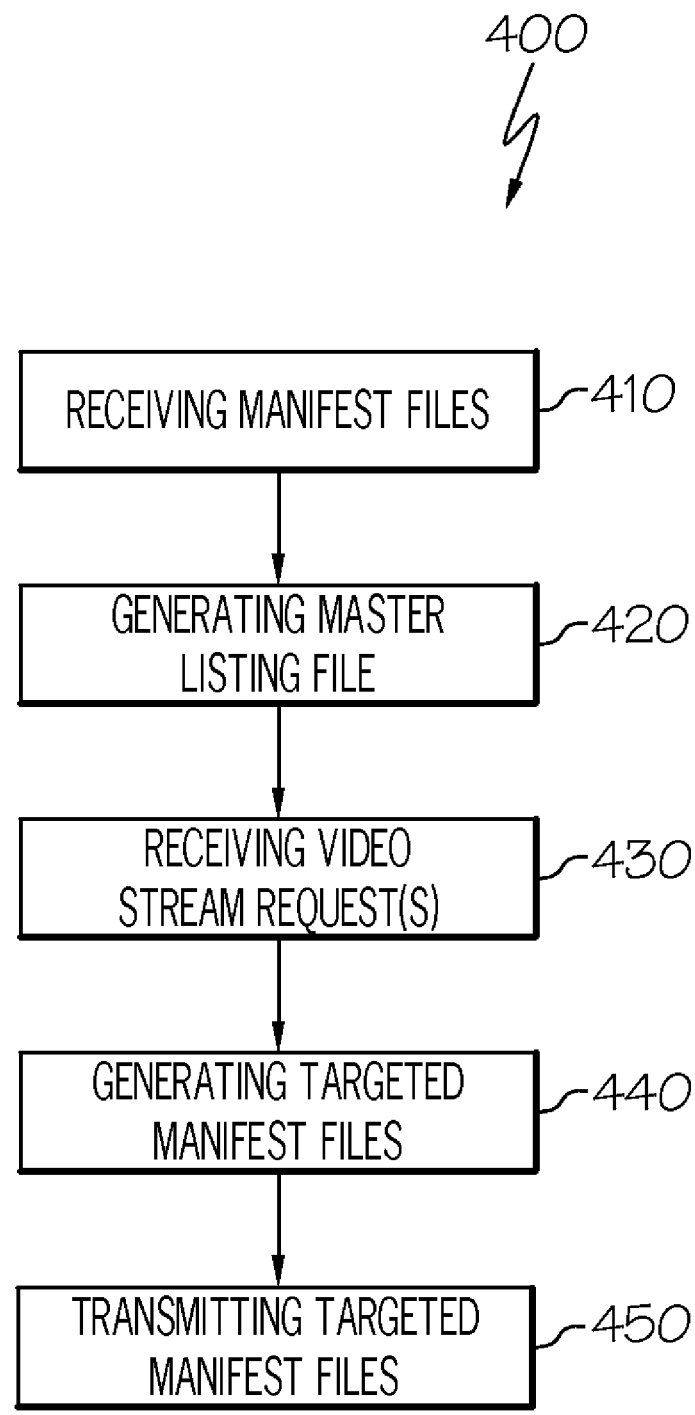
FIG. 5 is a flow diagram illustrating a method of generating targeted manifest files for use by a playback device, according to one embodiment of the present invention.

FIG. 5 is a flow diagram illustrating a method of generating targeted manifest files for use by a playback device, according to one embodiment of the present invention. The flow diagram 400 illustrates a method of generating targeted manifest files. The method 400 can be parallel processed for each client request for a broadcast stream or video-on-demand asset or for each group of clients requesting a broadcast stream or video-on-demand asset. At step 410, the content publishing system 200 receives a manifest file 115 that includes a sequence of media file locators. The sequence of media file locators identify a subset of media files 114 that constitute a portion of a specific audio/video feed 105.

At step 420, the content publishing system 200 generates or updates a master manifest file 240 of media file locators with media file locators included in the received manifest file 115. The master manifest file 240 includes a master ordered list or sequence of the media file locators listed in the received manifest file 115. Steps 410 through 420 can be repeated prior, during or after any of steps 430, 440 and 450 so that missing media file locators identified in newly received manifest files 115 can be added to the master manifest file 240.

At step 430, the content publishing system 200 receives a request 260 from a client device 300, and at step 440, the content publishing system 200 generates one or more targeted manifest files 250 from the master manifest file 240 resulting in a custom sequence of media file locators that identify media files 114 of a specific audio/video feed 105 and targeted media files 116 including targeted content. At step 450, the content publishing system 200 beings transmitting the one or more targeted manifest files 250 to the requesting client device 300. For cases where a group of users (see for example, the group of users 310, 320, 330 shown in FIG. 2) request the same broadcast stream or video-on-demand asset, the processing of steps 430, 440 and 450 can be common across users belonging to the same group.

Figure 6:
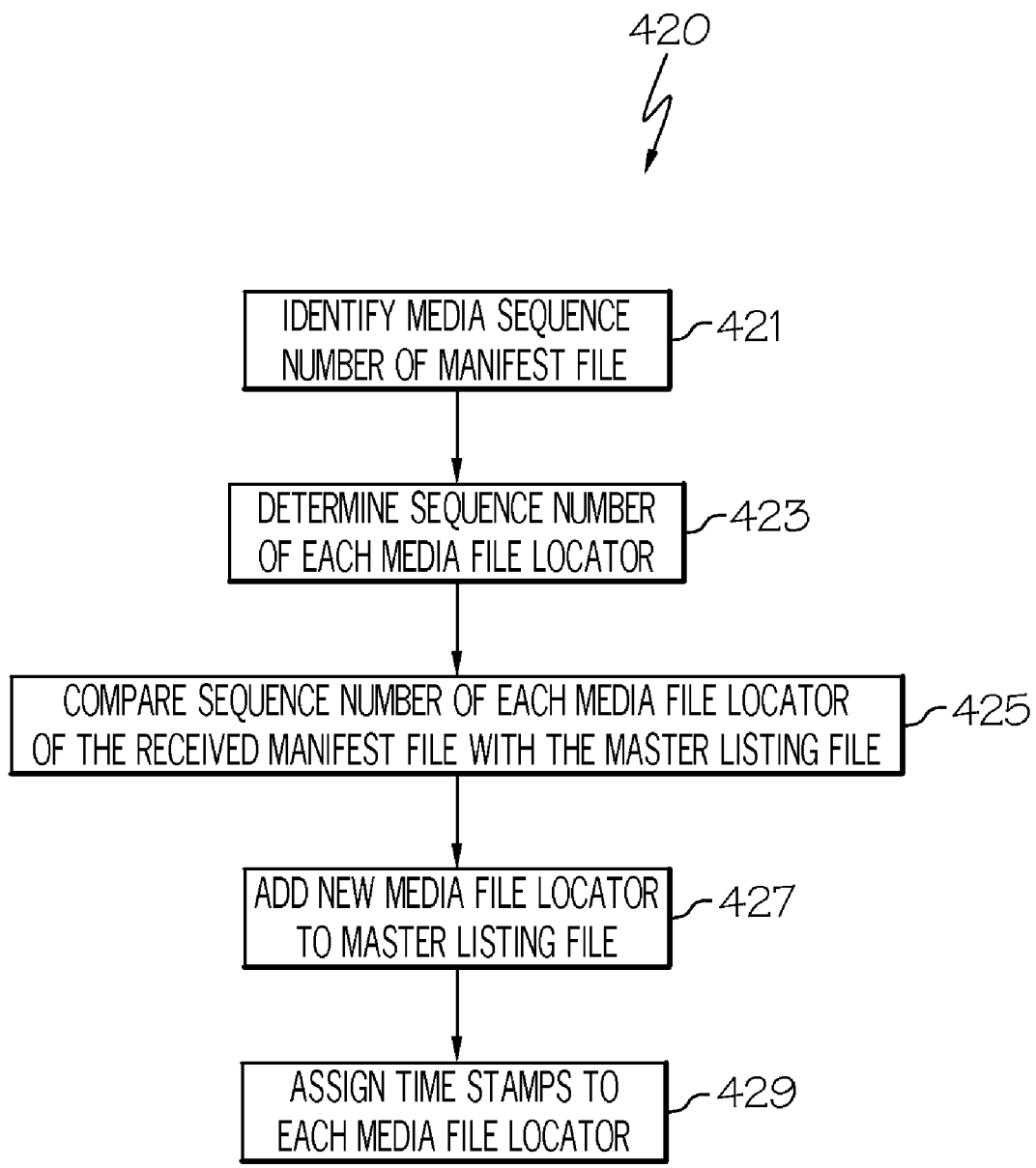
FIG. 6 is a flow diagram illustrating a method of generating a master manifest file, according to one embodiment of the present invention.

FIG. 6 is a flow diagram illustrating a method of generating a master manifest file, according to one embodiment of the present invention. The step of generating or updating the master manifest file can include one or more additional sub-steps.

At step 421, a merging sub-system 235 of the content publishing system 200 identifies a media sequence number 314 of the received manifest file 115. The media sequence number 314 can be indicated by an information tag included in the received manifest file 115, and can represent the sequence number of the first media file locator listed in the received manifest file 115.

At step 423, the merging sub-system 235 determines the unique sequence number of each media file locator listed in the received manifest file 115. The unique sequence number of each media file locator listed in the received manifest file 115 can be determined based on the media sequence number identified at step 421. For example, the unique sequence number of each media file locator listed in the received manifest file 115 can be determined by incrementing the media sequence number for each subsequent media file locator listed in the received manifest file 115.

At step 425, the merging sub-system compares the unique sequence number of each media file locator listed in the received manifest file with the unique sequence number of each media file locator listed in the master manifest file 240 to determine if any media file locators listed in the received manifest file 115 are missing. Alternatively, the merging sub-system compares the unique sequence number of each media file locator listed in the received manifest file with the unique sequence number of that last media file locator listed in the master manifest file 240 to determine if any media file locators listed in the received manifest file 115 are missing. At step 427, any missing media file locators are added to the master manifest file 240.

At step 429, the merging sub-system assignees relative timestamps 317 to each of the media file locators of the master manifest file 240 based on a running time of the stream. The running time of the stream can be determined based on the unique sequence number and time duration tag associated with each media file locator of the master manifest file 240.

Figure 7:
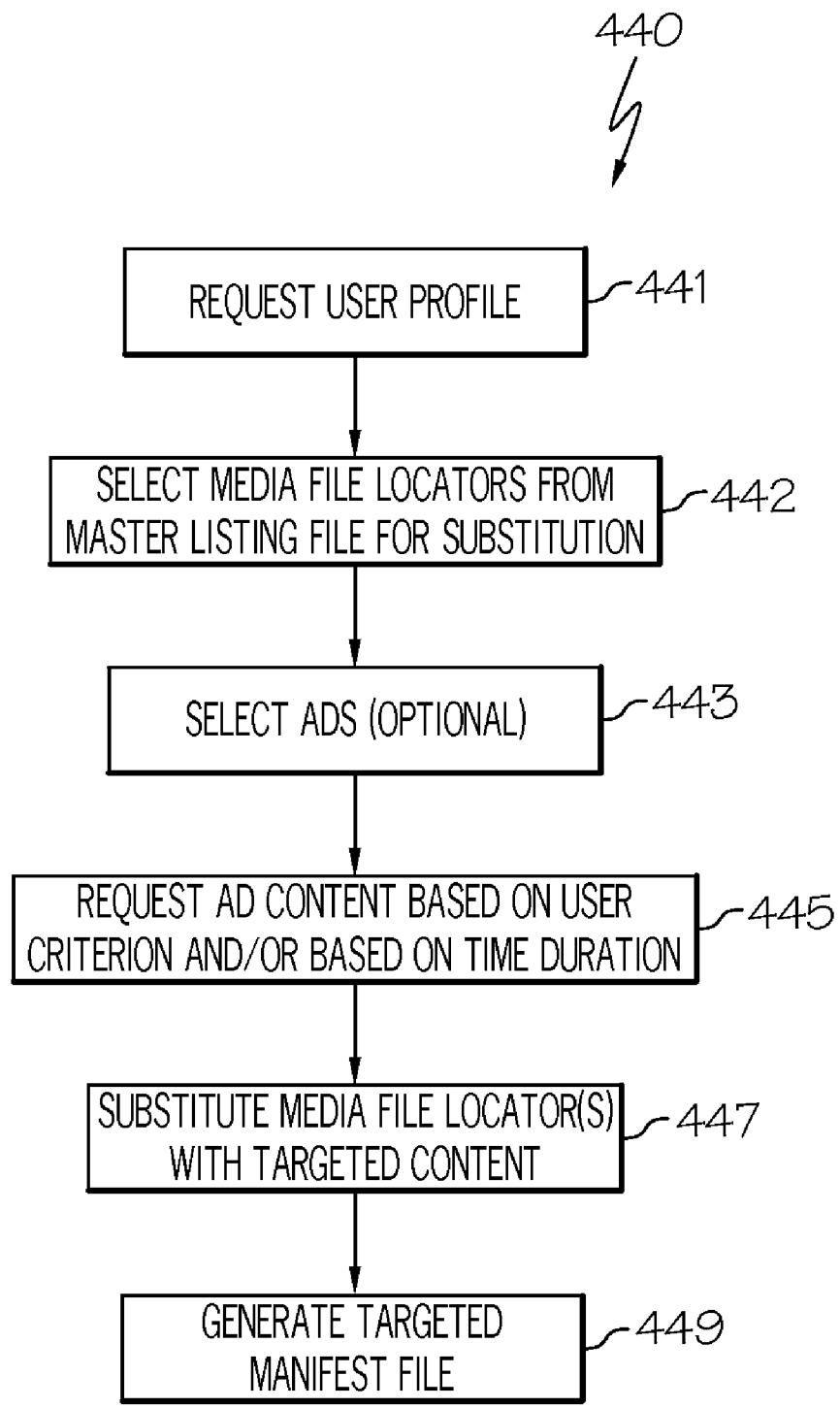
FIG. 7 is a flow diagram illustrating a method of generating targeted manifest files from a master manifest file, according to one embodiment of the present invention.

FIG. 7 is a flow diagram illustrating a method of generating targeted manifest files from a master manifest file, according to one embodiment of the present invention. The step of generating targeted manifest files can include one or more additional sub-steps.

At step 441, a media replacement sub-system 245 of the content publishing system 200 requests a user or group profile associated with a user of the requesting client device from a profile database 210. The user or group profile can include one or more user or group characteristics that can be used to select targeted media file locators for substitution with media file locators of the master manifest file 240.

At step 442, the media replacement sub-system 245 selects one or more consecutive media files listed in the master manifest file 240 for substitution with a different number of targeted media file locators. The media file locators listed in the master manifest file 240 can be selected for substitution based on a content type of the media files associated with the media file locators. For example, media file locators listed in the master manifest file 240 that are associated with advertising content or news content can be selected for substitution.

At step 443, an optional ad decision router 247 of the media replacement sub-system 245 selects an ad decision system 130, 135 for step 445 based on, for example, a configurable rule set. At step 445, the media replacement sub-system 245 requests targeted media file locators that identify targeted media content from a selected ad decision system 130, 135 based on a combined time duration of the media file locators selected for substitution at step 442. The request submitted to the selected ad decision system 130, 135 can also be based on the content type of the media files associated with the media file locators selected for substitution at step 442.

At step 447, the media replacement sub-system substitutes the media file locators selected at step 442 with the targeted media file locators returned by the ad decision system 130, 135 at step 445. At step 449, the media replacement sub-system generates a targeted manifest file or a sequence of targeted manifest files for transmission to the requesting client device.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A computerized method for dynamically generating a targeted manifest file for use by a playback device to retrieve a video stream including targeted content, comprising:
   periodically receiving a manifest file that identifies a sequence of media files, the sequence of media files constituting a portion of a video stream;
   updating a master manifest file to identify the sequence of media files from each periodically received index file, such that the master manifest file identifies a continuous master sequence of media files that constitute the video stream; and
   upon request from a playback device, generating a targeted manifest file from the continuous master sequence of media files, the targeted manifest file identifying a custom sequence of media files that includes targeted content, wherein one or more consecutive media files identified in the continuous master sequence of media files are substituted with a different number of targeted media files in the custom sequence of media files.

2. The computerized method of claim 1, wherein each periodically received manifest file includes a media sequence number that represents a first media file identified in the sequence of media files, the method further comprising:
   determining a unique sequence number of each of the media files identified in the periodically received index file based on the media sequence number; and
   updating the master manifest file to identify the media files identified in the periodically received index file that are missing from the master sequence of media files.

3. The computerized method of claim 2, wherein updating the master manifest file includes comparing the unique sequence number of each of the media files identified in the periodically received index file with the unique sequence number of each media files of the continuous master sequence of media files to identify the media files identified in the periodically received index file that are missing from the continuous master sequence of media files.

4. The computerized method of claim 2, wherein updating the master manifest file includes comparing the unique sequence number of each of the media files identified in the periodically received index file with the unique sequence number of the last media file identified in the continuous master sequence of media files to identify the media files identified in the periodically received index file that are missing from the continuous master sequence of media files.

5. The computerized method of claim 1, wherein generating the targeted manifest file from the continuous master sequence of media files further comprises:
substituting at least two consecutive media files identified in the continuous master sequence of media files associated with a combined presentation period with a different number of targeted media files in the custom sequence of media files having the same combined presentation period.

6. The computerized method of claim 5, wherein substituting the at least two consecutive media files includes substituting the at least two consecutive media files identified in the continuous master sequence of media files associated with the combined presentation period with a greater number of targeted media files in the custom sequence of media files having the same combined presentation period.

7. The computerized method of claim 5, wherein substituting the at least two consecutive media files includes substituting the at least two consecutive media files identified in the continuous master sequence of media files associated with the combined presentation period with a fewer number of targeted media files in the custom sequence of media files having the same combined presentation period.

8. The computerized method of claim 1, wherein generating the targeted manifest file from the continuous master sequence of media files further comprises:
requesting a user profile associated with a user of the playback device; and
identifying the targeted media files for substitution based on at least one characteristic of the user profile.

9. The computerized method of claim 1, wherein the one or more consecutive media files are identified for substitution based on an informational tag associated with each of the one or more consecutive media files, wherein the informational tag identifies the associated media file as an advertisement.

10. A computerized system for dynamically generating a targeted manifest file for use by a playback device to retrieve a video stream including targeted content, comprising:
a content publishing system configured to periodically receive a manifest file from a transcoding system, the manifest file identifying a sequence of media files that constitute a portion of a video stream, wherein the content publishing system is configured to:
update a master manifest file to identify the sequence of media files from each periodically received index file, such that the master manifest file identifies a continuous master sequence of media files that constitute the video stream; and
upon request from a playback device, generate a targeted manifest file from the continuous master sequence of media files, the targeted manifest file identifying a custom sequence of media files that includes targeted content, wherein one or more consecutive media files identified in the continuous master sequence of media files are substituted with a different number of targeted media files in the custom sequence of media files.

11. A computer program product, tangibly embodied in a computer readable storage device, for dynamically generating a targeted manifest file for use by a playback device to retrieve a video stream including targeted content, comprising instructions being executable to cause a computer to:
periodically receive a manifest file that identifies a sequence of media files, the sequence of media files constituting a portion of a video stream;
update a master manifest file to identify the sequence of media files from each periodically received index file, such that the master manifest file identifies a continuous master sequence of media files that constitute the video stream; and
upon request from a playback device, generate a targeted manifest file from the continuous master sequence of media files, the targeted manifest file identifying a custom sequence of media files that includes targeted content, wherein one or more consecutive media files identified in the continuous master sequence of media files are substituted with a different number of targeted media files in the custom sequence of media files.

12. A computerized method for dynamically generating targeted manifest files for use by playback devices in retrieving video streams that include targeted content, comprising:
periodically receiving a manifest file that includes a first sequence of media file locators, the media file locators identifying media files constituting at least a portion of a video stream;
updating a master manifest file to include the first sequence of media file locators from each periodically received manifest file, such that the master manifest file includes a master sequence of the media file locators that constitute the video stream;
upon request from a playback device, generating a targeted manifest file from the master sequence of media file locators that includes a second sequence of media file locators, wherein one or more media file locators of the master sequence of media file locators are substituted with a different number of targeted media file locators to generate the second sequence of media file locators of the targeted manifest file.

13. The computerized method of claim 12, wherein each periodically received manifest file includes a media sequence number that indicates a unique sequence number of a first media file locator in the first sequence of media file locators, the method further comprising:
determining a unique sequence number of each media file locator in the first sequence of media file locators based on the media sequence number of the received manifest file; and
updating the master manifest file to include the media file locators of the first sequence of media file locators that are missing from the master sequence of media file locators.

14. The computerized method of claim 12, wherein the received manifest file includes at least one informational tag that specifies a time duration of the media files identified by the media file locators of the first sequence of media file locators.

15. The computerized method of claim 14, wherein generating the master manifest file further includes assigning relative timestamps to each of the media file locators of the master sequence of media file locators based on the at least one informational tag.

16. The computerized method of claim 12 further comprising:
requesting a user profile associated with a user of a playback device; and
identifying the targeted media file locators for substitution based on at least one user characteristic of the user profile.

17. The computerized method of claim 12, wherein generating the targeted manifest file from the master sequence of media file locators further comprises:
substituting at least two media file locators of the master sequence of media file locators with a different number of targeted media file locators, wherein a combined time duration of the media files identified by the at least two media file locators of the master sequence of media file locators is substantially similar to a combined time duration of the media files identified by the different number of targeted media file locators.

18. The computerized method of claim 12, wherein generating the targeted manifest file from the master sequence of media file locators further comprises:

selecting the one or more media file locator of the master sequence of media file locators for substitution based on the content type of the media files identified by the one or more media file locators.

19. The computerized method of claim 12, wherein generating the targeted manifest file from the master sequence of media file locators further comprises:

requesting the targeted media file locators from one or more ad decision systems based on a combined time duration of the one or more media file locators that are selected for substitution.

20. The computerized method of claim 19, wherein generating the targeted manifest file from the master sequence of media file locators further comprises:

requesting the targeted media file locators from the one or more ad decision systems based on at least one user characteristic, group characteristic, content type or request time of day.

21. The computerized method of claim 19, wherein requesting the targeted media file locators further comprises:

receiving a target identifier that identifies a location of a target manifest file, wherein the target manifest file includes the targeted media file locators.

* * * * *

UNITED STATES PATENT AND TRADEMARK OFFICE
CERTIFICATE OF CORRECTION

| | | |
|---|---|---|
| PATENT NO. | : 8,234,350 B1 | Page 1 of 1 |
| APPLICATION NO. | : 13/330409 | |
| DATED | : July 31, 2012 | |
| INVENTOR(S) | : Lei Gu et al. | |

It is certified that error appears in the above-identified patent and that said Letters Patent is hereby corrected as shown below:

In claim 12, at column 16, line 22, delete "the".

In claim 18, at column 17, line 9, delete "locator" and replace it with --locators--.

Signed and Sealed this
Sixth Day of November, 2012

David J. Kappos
*Director of the United States Patent and Trademark Office*